United States Patent
Gong (10) Patent No.: US 9,590,788 B2
(45) Date of Patent: Mar. 7, 2017

(54) METHOD AND APPARATUS FOR FEEDING BACK INFORMATION, AND TERMINAL

(71) Applicant: Huawei Technologies Co., Ltd., Shenzhen, Guangdong (CN)

(72) Inventor: Zhengwei Gong, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 386 days.

(21) Appl. No.: 14/465,568

(22) Filed: Aug. 21, 2014

(65) Prior Publication Data

US 2015/0009849 A1    Jan. 8, 2015

Related U.S. Application Data

(63) Continuation of application No. PCT/CN2013/071295, filed on Feb. 2, 2013.

(30) Foreign Application Priority Data

Feb. 21, 2012   (CN) .......................... 2012 1 0039559

(51) Int. Cl.
*H04J 3/16* (2006.01)
*H04L 5/00* (2006.01)
(Continued)

(52) U.S. Cl.
CPC ........... *H04L 5/0057* (2013.01); *H04B 7/024* (2013.01); *H04L 1/0026* (2013.01);
(Continued)

(58) Field of Classification Search
CPC ..... H04B 7/024; H04B 17/382; H04L 5/0035; H04L 1/0026; H04W 24/02
See application file for complete search history.

(56) References Cited

U.S. PATENT DOCUMENTS

2010/0056215 A1* 3/2010 Gorokhov .............. H04B 7/024
                                                          455/561
2010/0239036 A1* 9/2010 Koo ....................... H04B 7/024
                                                          375/260

(Continued)

FOREIGN PATENT DOCUMENTS

CN        101110623 A       1/2008
CN        101583161 A       11/2009

(Continued)

*Primary Examiner* — Kevin C Harper
(74) *Attorney, Agent, or Firm* — Leydig, Voit & Mayer, Ltd.

(57) ABSTRACT

A method for feeding back information includes: measuring a CQI of a link between each coordinated transmitting node in a coordinated transmitting node set and a terminal; using the CQI of and an RI value corresponding to the link between each coordinated transmitting node and the terminal as parameters of a spectral efficiency calculation function, and obtaining a spectral efficiency value corresponding to the link between each coordinated transmitting node and the terminal; when a value of the selection criterion function is less than or equal to a preconfigured comparison threshold value, selecting a corresponding coordinated transmitting node as a preferred coordinated transmitting node; and sending information of the preferred coordinated transmitting node to a transmitting end for selection. This may reduce uplink feedback overheads and enable the transmitting end to quickly determine the preferred coordinated transmitting node.

20 Claims, 3 Drawing Sheets

(51) Int. Cl.
*H04L 1/00* (2006.01)
*H04B 7/02* (2006.01)
*H04W 24/08* (2009.01)
*H04B 7/06* (2006.01)

(52) U.S. Cl.
CPC .......... H04L 5/0035 (2013.01); H04W 24/08 (2013.01); *H04B 7/063* (2013.01); *H04B 7/0632* (2013.01); *H04B 7/0639* (2013.01)

(56) References Cited

U.S. PATENT DOCUMENTS

| | | | |
|---|---|---|---|
| 2010/0284346 A1* | 11/2010 | Rudrapatna | H04W 72/1247 370/329 |
| 2012/0088514 A1 | 4/2012 | Lee et al. | |
| 2012/0140652 A1 | 6/2012 | Pan et al. | |
| 2014/0204871 A1* | 7/2014 | Ode | H04B 7/024 370/329 |

FOREIGN PATENT DOCUMENTS

| | | | |
|---|---|---|---|
| CN | 101674275 A | 3/2010 |
| CN | 101800578 A | 8/2010 |
| CN | 101867964 A | 10/2010 |
| CN | 102104966 A | 6/2011 |
| CN | 102291839 A | 12/2011 |
| EP | 1892851 A2 | 2/2008 |
| WO | WO 2010140860 A2 | 12/2010 |

* cited by examiner

METHOD AND APPARATUS FOR FEEDING BACK INFORMATION, AND TERMINAL

CROSS-REFERENCE TO RELATED APPLICATIONS

This application is a continuation of International Patent Application No. PCT/CN2013/071295, filed on Feb. 2, 2013, which claims priority to Chinese Patent Application No. 201210039559.6, filed on Feb. 21, 2012, all of which are hereby incorporated by reference in their entireties.

TECHNICAL FIELD

The present invention relates to the field of communications technologies, and in particular, to a method apparatus for feeding back information and a terminal.

BACKGROUND

In a Long Term Evolution-Advanced (LTE-A) system, a low power node (LPN) and a macro eNB (MeNB) are deployed in a hybrid manner to form a heterogeneous network (HetNet), in order to improve communication quality in a hot spot, a blind spot and an edge area; meanwhile, coordinated multi-point (CoMP) is employed to solve inter-cell interference. One type of CoMP is dynamic point selection (DPS), which enables a transmitting end to select an optimal coordinated transmitting node (that is, an LPN) to achieve an objective of improving system performance. During an implementation process of the DPS, the transmitting end needs to obtain link channel quality information of a link between each coordinated transmitting node and a terminal. In order to solve this problem, some conventional solutions are set forth, requiring a terminal to measure a CQI of a link between each coordinated transmitting node and the terminal and feed back all the CQIs to the transmitting end. Apparently, in solutions of this kind, the amount of feedbacks from the terminal increases linearly along with the quantity of transmitting nodes, thereby causing a multi-fold increase of uplink feedback overheads.

SUMMARY

Embodiments of the present invention provide a method and apparatus for feeding back information and a terminal, which can reduce uplink feedback overheads.

An aspect of an embodiment of the present invention provides a method for feeding back information, including:

measuring channel quality information of a link between each coordinated transmitting node in a coordinated transmitting node set and a terminal, where coordinated transmitting nodes in the coordinated transmitting node set are deployed around a current primary service transmitting node of the terminal;

taking the channel quality information of the link between each coordinated transmitting node and the terminal and a channel rank indication value corresponding to the link between each coordinated transmitting node and the terminal as parameters of a spectral efficiency calculation function, and obtaining a spectral efficiency value corresponding to the link between each coordinated transmitting node and the terminal;

taking a spectral efficiency value corresponding to a link between the current primary service transmitting node and the terminal and the spectral efficiency value corresponding to the link between each coordinated transmitting node and the terminal as parameters of a selection criterion function, and when a value of the selection criterion function is less than or equal to a preconfigured comparison threshold value, selecting a corresponding coordinated transmitting node as a preferred coordinated transmitting node; and sending information of the preferred coordinated transmitting node to a transmitting end for selection.

Another aspect of an embodiment of the present invention provides an apparatus for feeding back information, including:

a measuring unit, configured to measure channel quality information of a link between each coordinated transmitting node in a coordinated transmitting node set and a terminal, where coordinated transmitting nodes in the coordinated transmitting node set are deployed around a current primary service transmitting node of the terminal;

an obtaining unit, configured to use the channel quality information of the link between each coordinated transmitting node and the terminal and a channel rank indication value corresponding to the link between each coordinated transmitting node and the terminal as parameters of a spectral efficiency calculation function, and obtain a spectral efficiency value corresponding to the link between each coordinated transmitting node and the terminal;

a selecting unit, configured to use a spectral efficiency value corresponding to a link between the current primary service transmitting node and the terminal and the spectral efficiency value corresponding to the link between each coordinated transmitting node and the terminal as parameters of a selection criterion function, and when a value of the selection criterion function is less than or equal to a preconfigured comparison threshold value, select a corresponding coordinated transmitting node as a preferred coordinated transmitting node; and a sending unit, configured to send information of the preferred coordinated transmitting node to a transmitting end for selection.

Still another aspect of an embodiment of the present invention provides a terminal, where the foregoing apparatus for feeding back information and a mainboard apparatus are disposed in the terminal, and the mainboard apparatus is electrically connected to the foregoing apparatus for feeding back information.

In the foregoing technical solutions, information of a preferred coordinated transmitting node, rather than information of all coordinated transmitting nodes around a current primary service transmitting node, may be sent to a transmitting end. In this way, uplink feedback overheads may be reduced, which in turn enables the transmitting end to quickly determine the preferred coordinated transmitting node.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The embodiments of the present invention provide a method and apparatus for feeding back information of a coordinated transmitting node and also provide a terminal, which can reduce uplink feedback overheads and enable a transmitting end to quickly determine a preferred coordinated transmitting node. Detailed descriptions are given below.

Figure 1:
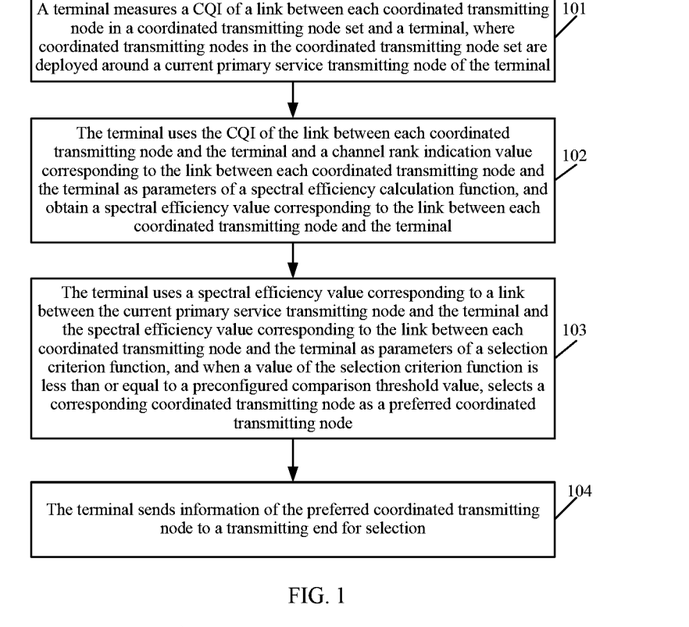
FIG. 1 is a flowchart of a method for feeding back information according to an embodiment of the present invention.

Referring to FIG. 1, FIG. 1 is a flowchart of a method for feeding back information according to an embodiment of the present invention. The method, described in FIG. 1, for feeding back information may be applicable to a heterogeneous network, and may also be applicable to a homogeneous network, which is not limited specifically in the embodiments of the present invention. The method for feeding back information, as described in FIG. 1, may be performed by a terminal, where the terminal may include a mobile phone, a personal digital assistant (PDA), a mobile internet device (MID), a laptop computer, and so on. As shown in FIG. 1, the method may include the following steps.

101. A terminal measures a CQI of a link between each coordinated transmitting node in a coordinated transmitting node set and the terminal, where coordinated transmitting nodes in the coordinated transmitting node set are deployed around a current primary service transmitting node of the terminal.

In an embodiment, the coordinated transmitting node set may be a set of all coordinated transmitting nodes configured around the current primary service transmitting node or a set of a part of coordinated transmitting nodes among all coordinated transmitting nodes configured around the current primary service transmitting node, which is not limited in the embodiments of the present invention. It may be understood that the coordinated transmitting node set may be preset by a network side.

Figure 2:
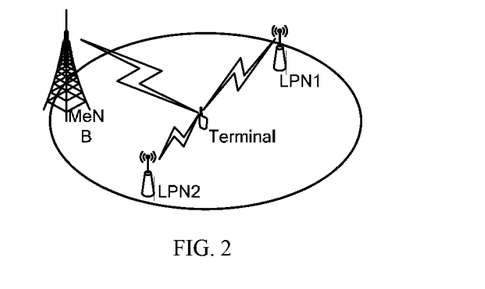
FIG. 2 is a diagram illustrating distribution of transmitting nodes in a heterogeneous network according to an embodiment of the present invention.

Referring also to FIG. 2, FIG. 2 is a diagram illustrating distribution of transmitting nodes in a heterogeneous network according to an embodiment of the present invention. As shown in FIG. 2, an MeNB serves as a current primary service transmitting node of a terminal while an LPN1 and an LPN2 that are deployed around the MeNB may be regarded as two coordinated transmitting nodes in a coordinated transmitting node set. In a homogeneous network, a transmitting node to which a terminal belongs is a current primary service transmitting node of the terminal, while other transmitting nodes deployed around the current primary service transmitting node of the terminal may be regarded as coordinated transmitting nodes in a coordinated transmitting node set.

In an embodiment, the CQI measured by the terminal for the link between each coordinated transmitting node in the coordinated transmitting node set and the terminal may be represented by a signal to interference plus noise ratio (Signal to Interference plus Noise Ratio, SINR) of the link, or may be represented by receive power of the link, which is not limited in the embodiments of the present invention.

102. The terminal uses the CQI of the link between each coordinated transmitting node and the terminal and a channel rank indication (Rank Indication, RI) value corresponding to the link between each coordinated transmitting node and the terminal as parameters of a spectral efficiency calculation function, and obtains a spectral efficiency value corresponding to the link between each coordinated transmitting node and the terminal.

In an embodiment, the terminal may use a CQI (represented by $d_{SINR}$) of the link between each coordinated transmitting node and the terminal and an RI value (represented by $RI^S$) corresponding to the link between each coordinated transmitting node and the terminal as parameters of a spectral efficiency calculation function $F(\bullet)$ and obtain a spectral efficiency value (represented by $d_{SE}^S$) corresponding to the link between each coordinated transmitting node and the terminal, that is, $d_{SE}^S = F(d_{SINR}, RI^S)$. The spectral efficiency calculation function $F(\bullet)$ is a relatively common type of calculation function in a spectral efficiency calculation process. A specific calculation process of the function is not elaborated in the embodiments of the present invention.

103. The terminal uses a spectral efficiency value corresponding to a link between the current primary service transmitting node and the terminal and the spectral efficiency value corresponding to the link between each coordinated transmitting node and the terminal as parameters of a selection criterion function, and when a value of the selection criterion function is less than or equal to a preconfigured comparison threshold value, select a corresponding coordinated transmitting node as a preferred coordinated transmitting node.

In an embodiment, the terminal may use a spectral efficiency value $d_{SE}^P$ corresponding to the link between the current primary service transmitting node and the terminal and a spectral efficiency value $d_{SE}^S$ corresponding to the link between each coordinated transmitting node and the terminal as parameters of a selection criterion function $F(\bullet)$, and when a value of $f(d_{SE}^P, d_{SE}^S)$ is less than or equal to a preconfigured comparison threshold value $d_{Thr}$, select a corresponding coordinated transmitting node as a preferred coordinated transmitting node. Conversely, if the value of $f(d_{SE}^P, d_{SE}^S)$ is greater than the preconfigured comparison threshold value $d_{Thr}$, it indicates that the node is not suitable for being selected as a preferred coordinated transmitting node. The selection criterion function $F(\bullet)$, for example, $f(d_{SE}^P, d_{SE}^S) = |d_{SE}^P, d_{SE}^S|$, is a relatively common type of selection criterion function in a DPS implementation process. A specific calculation process of the function is not elaborated in the embodiments of the present invention.

104. The terminal sends information of the preferred coordinated transmitting node to a transmitting end for selection.

In this embodiment of the present invention, the transmitting end may be the current primary service transmitting node (such as the MeNB shown in FIG. 2) of the terminal, or any one coordinated transmitting node (such as the LPN1 or the LPN2 shown in FIG. 2) in the coordinated transmitting node set, or a network node of a higher layer, which is not limited in the embodiments of the present invention. After the transmitting end receives information of the preferred coordinated transmitting node sent by the terminal, the preferred coordinated transmitting node may be selected to participate in communication transmission, thereby improving system performance.

In the method described in FIG. 1, the terminal may send to the transmitting end the information of the preferred coordinated transmitting node rather than information of all coordinated transmitting nodes around the current primary service transmitting node. In this way, uplink feedback overheads may be reduced, which in turn enables the transmitting end to quickly determine the preferred coordinated transmitting node.

Figure 3:
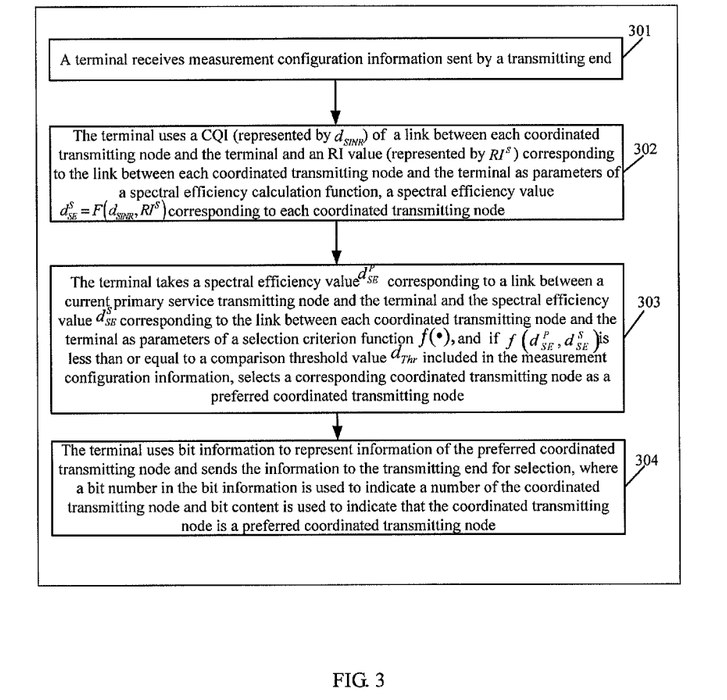
FIG. 3 is a flowchart of a method for feeding back information according to another embodiment of the present invention.

Referring to FIG. 3, FIG. 3 is a flowchart of a method for feeding back information according to another embodiment of the present invention. In the method for feeding back information, as described in FIG. 3, measurement configuration information (also referred to as half-static configuration information) may be preconfigured on a terminal, so that the terminal may determine a comparison threshold value $d_{Thr}$ and various types of information required for measuring a CQI of a link between each coordinated transmitting node in a coordinated transmitting node set and the terminal. In an embodiment, the measurement configuration information may be distributed to the terminal by a transmitting end, for example, the transmitting end may send the measurement configuration information every dozens of or hundreds of milliseconds to the terminal by using a radio resource control (Radio Resource Control, RRC) instruction, so that the terminal may obtain the measurement configuration information periodically. The method for feeding back information, as described in FIG. 3, may include the following steps.

301. A terminal receives measurement configuration information sent by a transmitting end.

In an embodiment, the foregoing measurement configuration information includes at least a comparison threshold value $d_{Thr}$ and a transmission mode TM of a link between each coordinated transmitting node in a coordinated transmitting node set and the terminal.

In an embodiment, the transmission mode TM of the link between each coordinated transmitting node in the coordinated transmitting node set and the terminal is consistent with a transmission mode TM of a link between a current primary service transmitting node and the terminal.

In an embodiment, the foregoing measurement configuration information may further include other parameters that are consistent with parameters corresponding to the current primary service transmitting node. For example, the other parameters may include the quantity of sub-bands of each coordinated transmitting node, and a report mode and a report resource of information of each preferred coordinated transmitting node, which is not limited in the embodiments of the present invention.

In an embodiment, the foregoing comparison threshold value $d_{Thr}$ may be a threshold value corresponding to a CQI, or a threshold value corresponding to a spectral efficiency, which is not limited in the embodiments of the present invention.

302. The terminal uses a CQI (represented by $d_{SINR}$) of the link between each coordinated transmitting node and the terminal and an RI value (represented by $RI^S$) corresponding to the link between each coordinated transmitting node and the terminal as parameters of a spectral efficiency calculation function F(•), and calculates a spectral efficiency value $d_{SE}^S = F(d_{SINR}, RI^S)$ corresponding to the link between each coordinated transmitting node and the terminal.

In an embodiment, the foregoing RI value corresponding to the link between each coordinated transmitting node and the terminal may be a smaller value between the quantity of antenna ports for a channel state information reference signal (Channel State Information Reference Signal, CSI-RS) or a cell specific reference signal (Cell Specific Reference Signal, CRS) of each coordinated transmitting node and an RI value of the current primary service transmitting node. Specifically, the terminal may compare the quantity $P_{CSI-RS}$ of antenna ports for a CSI-RS or CRS of each coordinated transmitting node with an RI value $RI^P$ corresponding to the link between the current primary service transmitting node and the terminal, and determine an RI value $RI^S = \min\{RI^P, P_{CSI-RS}\}$ corresponding to the link between the coordinated transmitting node and the terminal.

In an embodiment, a precoding matrix indication (Precoding Matrix Indication, PMI) value is required by the terminal to measure the CQI corresponding to the link between each coordinated transmitting node and the terminal. The PMI value may be obtained by the terminal by measuring the link between each coordinated transmitting node and the terminal, which is not elaborated in the embodiments of the present invention.

303. The terminal uses a spectral efficiency value $d_{SE}^P$ corresponding to the link between the current primary service transmitting node and the terminal and the calculated spectral efficiency value $d_{SE}^S$ corresponding to the link between each coordinated transmitting node and the terminal as parameters of a selection criterion function F(•), and if $f(d_{SE}^P, d_{SE}^S) \le$ the comparison threshold value $d_{Thr}$ included in the measurement configuration information, selects a corresponding coordinated transmitting node as a preferred coordinated transmitting node.

The spectral efficiency value $d_{SE}^P$ corresponding to the link between the current primary service transmitting node and the terminal is known to the terminal.

304. The terminal uses bit information to represent information of the preferred coordinated transmitting node and sends the information to the transmitting end for selection, where a bit number in the bit information is used to indicate a number of a coordinated transmitting node, and bit content is used to indicate that the coordinated transmitting node is a preferred coordinated transmitting node.

For example, if bit content is 1, it indicates that the coordinated transmitting node is a preferred coordinated transmitting node; or if bit content is 0, it indicates that the coordinated transmitting node is not a preferred coordinated transmitting node. The embodiments of the present invention sets no limitation thereto.

In an embodiment, if the quantity $N_{Mea}$ (such as $N_{Mea}=2$ shown in FIG. 2) of coordinated transmitting nodes in the coordinated transmitting node set is relatively small, which makes the quantity of preferred coordinated transmitting nodes relatively small, information of all the preferred coordinated transmitting nodes may be represented by bit information and sent to the transmitting end for selection.

In an embodiment, if the quantity of coordinated transmitting nodes in the coordinated transmitting node set is relatively large, which makes the quantity of preferred coordinated transmitting nodes relatively large, information of a preset quantity L of preferred coordinated transmitting nodes may be selected and represented by bit information and sent to the transmitting end for selection. Whether the quantity of coordinated transmitting nodes is relatively large or relatively small may be determined according to an actual requirement, which is not limited in the present invention.

In an embodiment, the terminal may also send bit coding information corresponding to a combination of the information of the preferred coordinated transmitting node to the transmitting end for selection, to further reduce uplink feedback overheads. For example, assuming that numbers of coordinated nodes are 0, 1, and 2 respectively, there may be 8 combinations of information of the preferred coordinated transmitting nodes, and each combination is assigned a corresponding bit coding information, so that the transmitting end may learn, after receiving the bit coding information, a coordinated transmitting node that may serve as a preferred coordinated transmitting node. For example, assuming that among 3 coordinated transmitting nodes, no coordinated transmitting node may be selected as a preferred coordinated transmitting node, bit coding information 000 may be used to represent information of the preferred coordinated transmitting node and sent to the transmitting end, and the transmitting end may learn, after receiving the bit coding information 000, that currently there is no preferred coordinated transmitting node; assuming that among 3 coordinated transmitting nodes, two coordinated transmitting nodes numbered 0 and 1 may be selected as preferred coordinated transmitting nodes, bit coding information 001 may be used to represent information of the preferred coordinated transmitting nodes and sent to the transmitting end, and the transmitting end may learn, after receiving the bit coding information 001, that the corresponding coordinated transmitting nodes numbered 0 and 1 may be selected as preferred coordinated transmitting nodes; then, assuming that among 3 coordinated transmitting nodes, two coordinated transmitting nodes numbered 1 and 2 may be selected as preferred coordinated transmitting nodes, bit coding information 010 may be used to represent information of the preferred coordinated transmitting nodes and sent to the transmitting end, and the transmitting end may learn, after receiving the bit coding information 010, that the corresponding coordinated transmitting nodes numbered 1 and 2 may be selected as preferred coordinated transmitting nodes. As can be seen, it is only required that a correspondence between each type of bit coding information and each combination of information of the preferred coordinated transmitting node be negotiated in advance between the transmitting end and the terminal.

In this embodiment of the present invention, when the terminal sends bit coding information corresponding to a combination of information of the preferred coordinated transmitting node to the transmitting end, $$\log_2\left(\sum_{l=0}^{L} C_{N_{Mea}}^l\right)$$

bits are required, where L represents the maximum quantity of the coordinated transmitting nodes that may be reported.

In this embodiment of the present invention, the terminal sends bit numbering information corresponding to a finite number of combinations of information of the preferred coordinated transmitting nodes to the transmitting end. In this way, uplink feedback overheads may be reduced, and the amount of reduction may be more significant when the quantity of coordinated transmitting nodes in the coordinated transmitting node set is relatively large.

In an embodiment, the terminal may use bit information to represent the information of the preferred coordinated transmitting node and multiplex the information with the CQI of the link between the current primary service transmitting node and the terminal, and send the CQI, which is multiplexed with the bit information, of the link between the current primary service transmitting node and the terminal to the transmitting end for selection. For example, if the CQI of the link between the current primary service transmitting node and the terminal is A, information bits of A are $\{b_0, b_0, \ldots, b_{A-1}\}$, and the information of the preferred coordinated transmitting node is represented by bit information as B, the information bits of A after being multiplexed with B are $\{b_0, b_0, \ldots, b_{A-1}, b_A, b_{A+1}, \ldots, b_{A+b-1}\}$.

In an embodiment, the terminal may transmit the CQI, which is multiplexed with a bit information, of the link between the current primary service transmitting node and the terminal through a physical uplink control channel (Physical Uplink Control Channel, PUCCH) or a physical uplink shared channel (PUSCH) to the transmitting end for selection.

For example, the terminal may periodically send the CQI of the link between the current primary service transmitting node and the terminal to the transmitting end, the quantity of information bits (such as $\{b_0, b_0, \ldots, b_{A-1}\}$) occupied by the CQI, which is sent by the terminal, of the link between the current primary service transmitting node and the terminal is negotiated between the terminal and the transmitting end in advance, and therefore, after the transmitting end receives the CQI (such as $\{b_0, b_0, \ldots, b_{A-1}, b_A, b_{A+1}, \ldots, b_{A+B-1}\}$), which is sent by the terminal, of the link between the current primary service transmitting node and the terminal, the terminal may easily obtain information (such as $\{b_A, b_{A+1}, \ldots, b_{A+B-1}\}$), of the preferred coordinated transmitting node which is represented by the bit information, where $b^A$ represents an code of the first coordinated transmitting node, and content of $b^A$ indicates that the coordinated transmitting node is a preferred coordinated transmitting node; $b^{A+1}$ represents a number of the second coordinated transmitting node, and content of $b_{A+1}$ indicates that the coordinated transmitting node is a preferred coordinated transmitting node, . . . and so on.

In this embodiment of the present invention, the terminal sends the information of the preferred coordinated transmitting node by using the CQI of the link between the current primary service transmitting node and the terminal, so that the information of the preferred coordinated transmitting node may be periodically sent without adding extra signaling, which reduces load on an air interface of the terminal.

In the method described in FIG. 3, a terminal may use bit information to represent information of a preferred coordinated transmitting node and send the information to a transmitting end, instead of sending information of all coordinated transmitting nodes around a current primary service transmitting node to the transmitting end. In this way, uplink feedback overheads may be reduced, which in turn enables the transmitting end to quickly determine the preferred coordinated transmitting node.

Figure 4:
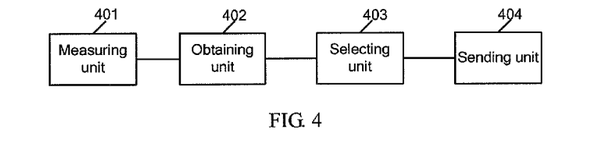
FIG. 4 is a structural diagram of an apparatus for feeding back information according to an embodiment of the present invention.

Referring to FIG. 4, FIG. 4 is a flowchart of an apparatus for feeding back information according to an embodiment of the present invention. The apparatus for feeding back information, as described in FIG. 4, may be built in a terminal, such as a mobile phone, a PDA, an MID or a laptop computer. As shown in FIG. 4, the apparatus may include a measuring unit 401, an obtaining unit 402, a selecting unit 403 and a sending unit 404.

The measuring unit 401 is configured to measure a CQI of a link between each coordinated transmitting node in a coordinated transmitting node set and a terminal, where coordinated transmitting nodes in the coordinated transmitting node set are deployed around a current primary service transmitting node of the terminal; the obtaining unit 402 is configured to use the CQI of the link between each coordinated transmitting node and the terminal and an RI value corresponding to the link between each coordinated transmitting node and the terminal as parameters of a spectral efficiency calculation function, and obtain a spectral efficiency value corresponding to the link between each coordinated transmitting node and the terminal; the selecting unit 403 is configured to use a spectral efficiency value corresponding to a link between the current primary service transmitting node and the terminal and the spectral efficiency value corresponding to the link between each coordinated transmitting node and the terminal as parameters of a selection criterion function, and when a value of the selection criterion function is less than or equal to a preconfigured comparison threshold value, select a corresponding coordinated transmitting node as a preferred coordinated transmitting node; and the sending unit 404 is configured to send information of the preferred coordinated transmitting node to a transmitting end for selection.

Figure 5:
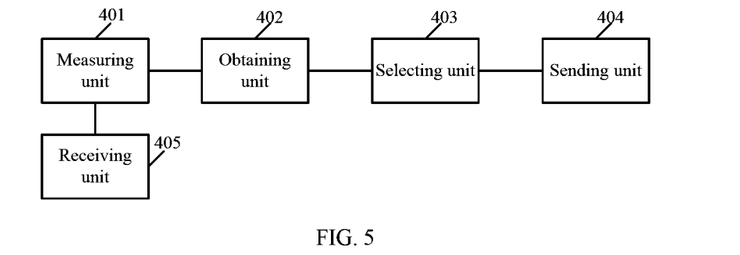
FIG. 5 is a structural diagram of an apparatus for feeding back information according to another embodiment of the present invention.

Referring also to FIG. 5, FIG. 5 is a structural diagram of an apparatus for feeding back information according to another embodiment of the present invention. The apparatus for feeding back information represents an improvement over the apparatus for feeding back information shown in FIG. 4. Compared with the apparatus for feeding back information shown in FIG. 4, the apparatus for feeding back information shown in FIG. 5 may further include a receiving unit 405. The receiving unit 405 is configured to receive measurement configuration information sent by a transmitting end, where the measurement configuration information includes at least a preconfigured comparison threshold value and a transmission mode TM of a link between each coordinated transmitting node in a coordinated transmitting node set and a terminal.

In an embodiment, the transmission mode TM of the link between each coordinated transmitting node in the coordinated transmitting node set and the terminal is consistent with a transmission mode TM of a link between a current primary service transmitting node and the terminal.

In an embodiment, the foregoing measurement configuration information may further include the quantity of subbands of each coordinated transmitting node, a report mode and a report resource of information of each preferred coordinated transmitting node, and so on.

A PMI value corresponding to the link between each coordinated transmitting node and the terminal is obtained by the terminal by measuring the link between each coordinated transmitting node and the terminal; and an RI value corresponding to the link between each coordinated transmitting node and the terminal is a smaller value between the quantity of antenna ports for a CSI-RS or a CRS of each coordinated transmitting node and an RI value corresponding to the current primary service transmitting node.

In the apparatuses for feeding back information shown in FIG. 4 and FIG. 5, the obtaining unit 402 is specifically configured to use a CQI value $d_{SINR}$ of the link between each coordinated transmitting node and the terminal and an RI value $RI^S$ corresponding to the link between each coordinated transmitting node and the terminal as parameters of a spectral efficiency calculation function $F(\bullet)$, and obtain a spectral efficiency value $d_{SE}=F(d_{SINR}, RI^S)$ corresponding to the link between each coordinated transmitting node and the terminal.

The PMI value required for measuring the $d^{SINR}$ of the link between each coordinated transmitting node and the terminal is obtained by the terminal by measuring the link between each coordinated transmitting node and the terminal; and the RI value corresponding to the link between each coordinated transmitting node and the terminal is a smaller value between the quantity of antenna ports for a channel state information reference signal or a cell specific reference signal of each coordinated transmitting node and the RI value corresponding to the link between the current primary service transmitting node and the terminal.

In the apparatuses for feeding back information shown in FIG. 4 and FIG. 5, the selecting unit 403 is specifically configured to use a spectral efficiency value $d_{SE}^P$ corresponding to the link between the current primary service transmitting node and the terminal and a spectral efficiency value $d_{SE}^S$ corresponding to the link between each coordinated transmitting node and the terminal as parameters of a selection criterion function $F(\bullet)$, and when a value of $f(d_{SE}^P, d_{SE}^S)$ is less than or equal to a preconfigured comparison threshold value $d_{Thr}$, select a corresponding coordinated transmitting node as a preferred coordinated transmitting node.

In the apparatuses for feeding back information shown in FIG. 4 and FIG. 5, the sending unit 404 is specifically configured to use bit information to represent the information of the preferred coordinated transmitting node and send the information to the transmitting end for selection, where a bit number in the bit information is used to represent a number of a coordinated transmitting node, and bit content is used to indicate that the coordinated transmitting node is a preferred coordinated transmitting node.

In the apparatuses for feeding back information shown in FIG. 4 and FIG. 5, the sending unit 404 is specifically configured to use bit information to represent the information of the preferred coordinated transmitting node and multiplex the information with the CQI of the link between the current primary service transmitting node and the terminal, and send the CQI, which is multiplexed with the bit information, of the link between the current primary service transmitting node and the terminal to the transmitting end for selection.

In the apparatuses for feeding back information shown in FIG. 4 and FIG. 5, the sending unit 404 is specifically configured to send bit coding information corresponding to a combination of the information of the preferred coordinated transmitting node to the transmitting end for selection, so as to further reduce uplink feedback overheads.

In an embodiment, the sending unit 404 is specifically configured to multiplex bit coding information corresponding to a combination of the information of the preferred coordinated transmitting node with the CQI of the link between the current primary service transmitting node and the terminal, and send the CQI, which is multiplexed with the bit coding information, of the link between the current primary service transmitting node and the terminal to the transmitting end for selection.

The apparatuses described in FIG. 4 and FIG. 5 may use bit information to represent information of a preferred coordinated transmitting node and send the information to a transmitting end, instead of sending information of all coordinated transmitting nodes around a current primary service transmitting node to the transmitting end. In this way, uplink feedback overheads may be reduced, which in turn enables the transmitting end to quickly determine the preferred coordinated transmitting node.

Figure 6:
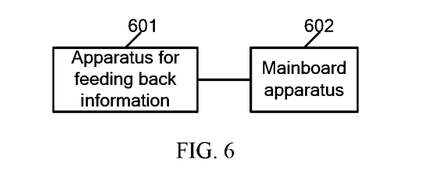
FIG. 6 is a structural diagram of a terminal according to an embodiment of the present invention.

Referring to FIG. 6, FIG. 6 is a structural diagram of a terminal according to an embodiment of the present invention. As shown in FIG. 6, the terminal may include an apparatus 601 for feeding back information and a mainboard apparatus 602, where the mainboard apparatus 602 is electrically connected to the apparatus 601 for feeding back information.

In this embodiment of the present invention, for a structure and a function of the apparatus 601 for feeding back information, reference may be made to the apparatuses for feeding back information described in FIG. 4 and FIG. 5, and details are not described herein again in this embodiment of the present invention.

In this embodiment of the present invention, the mainboard apparatus 602 is a module common to terminals such as a mobile phone, a PDA, an MID and a laptop computer, which is not elaborated in this embodiment of the present invention.

The terminal described in FIG. 6 may send information of a preferred coordinated transmitting node to a transmitting end, instead of sending information of all coordinated transmitting nodes around a current primary service transmitting node to the transmitting end. In this way, uplink feedback overheads may be reduced, which in turn enables the transmitting end to quickly determine the preferred coordinated transmitting node.

A person of ordinary skill in the art may understand that all or a part of the steps of the methods in the embodiments may be implemented by a program instructing relevant hardware. The program may be stored in a computer readable storage medium. The storage medium may include: a flash memory, a read-only memory (Read-Only Memory, ROM), a random access memory (Random Access Memory, RAM), a magnetic disk, or an optical disc.

The foregoing provides a detailed description of the method and apparatus for feeding back information and the terminal according to the embodiments of the present invention. Specific examples are used in this specification to describe the principle and implementations of the present invention. The descriptions of the foregoing embodiments are merely intended to help understand the method and core ideas of the present invention. In addition, with respect to the implementations and the application scope, modifications may be made by a person of ordinary skill in the art according to the idea of the present invention. Therefore, this specification shall not be construed as a limitation to the present invention.

What is claimed is:

1. A method for feeding back information, comprising:
   measuring channel quality information of a first link between each coordinated transmitting node in a coordinated transmitting node set and a terminal;
   taking the channel quality information of the first link and a channel rank indication value corresponding to the first link as parameters of a spectral efficiency calculation function, and obtaining a first spectral efficiency value corresponding to the first link;
   taking a second spectral efficiency value corresponding to a second link between a current primary service transmitting node and the terminal and the first spectral efficiency value as parameters of a selection criterion function, and when a value of the selection criterion function is less than or equal to a preconfigured comparison threshold value, selecting a corresponding coordinated transmitting node as a preferred coordinated transmitting node; and
   sending information of the preferred coordinated transmitting node to a transmitting end for selection.

2. The method according to claim 1, wherein the method further comprises:
   receiving measurement configuration information sent by the transmitting end, wherein the measurement configuration information comprises at least the preconfigured comparison threshold value and a transmission mode of the first link.

3. The method according to claim 2, wherein the transmission mode of the first link is consistent with a transmission mode of the second link.

4. The method according to claim 2, wherein the measurement configuration information further comprises a quantity of sub-bands of each coordinated transmitting node, and a report mode and a report resource of information of each preferred coordinated transmitting node.

5. The method according to claim 2, wherein the taking the channel quality information of the first link and the channel rank indication value corresponding to the first link, and the obtaining the spectral efficiency value comprises:
   taking channel quality information $d_{SINR}$ and a channel rank indication value $RI^S$ that correspond to the first link as parameters of a spectral efficiency calculation function $F(\bullet)$, and obtaining a spectral efficiency value $d_{SE}^S = F(d_{SINR}, RI^S)$ corresponding to the first link,
   wherein a precoding matrix indication value required for measuring the channel quality information $d_{SINR}$ of the link between each coordinated transmitting node and the terminal is obtained by the terminal by measuring the first link; and the channel rank indication value corresponding to the first link is a smaller value between a quantity of antenna ports for a channel state information reference signal or a cell specific reference signal of each coordinated transmitting node and a channel rank indication value corresponding to the second link.

6. The method according to claim 2, wherein the taking the second spectral efficiency value corresponding to the second link and the second spectral efficiency value as the parameters of the selection criterion function, and when the value of the selection criterion function is less than or equal to the preconfigured comparison threshold value, selecting the coordinated transmitting node as the preferred coordinated transmitting node comprise:
   taking a spectral efficiency value $d_{SE}^P$ corresponding to the second link, and a spectral efficiency value $d_{SE}^S$ corresponding to the first link as parameters of a selection criterion function $F(\bullet)$, and when a value of $f(d_{SE}^P, d_{SE}^S)$ is less than or equal to a preconfigured comparison threshold value $d_{Thr}$, selecting the corresponding coordinated transmitting node as the preferred coordinated transmitting node.

7. The method according to claim 2, wherein the sending the information of the preferred coordinated transmitting node to the transmitting end for selection comprises:
   using bit information to represent the information of the preferred coordinated transmitting node and sending the bit information to the transmitting end for selection, wherein a bit number in the bit information is used to indicate a number of a coordinated transmitting node, and bit content is used to indicate that the coordinated transmitting node is the preferred coordinated transmitting node.

8. The method according to claim 7, wherein the using the bit information to represent the information of the preferred coordinated transmitting node and sending the bit information to the transmitting end for selection comprises:
using the bit information to represent the information of the preferred coordinated transmitting node, multiplexing the information with channel quality information of the second link, and sending the channel quality information, which is multiplexed with the bit information, of the second link to the transmitting end for selection.

9. The method according to claim 2, wherein the sending the information of the preferred coordinated transmitting node to the transmitting end for selection comprises:
sending bit coding information corresponding to a combination of the information of the preferred coordinated transmitting node to the transmitting end for selection.

10. The method according to claim 9, wherein the sending the bit coding information corresponding to the combination of the information of the preferred coordinated transmitting node to the transmitting end for selection comprises:
multiplexing the bit coding information corresponding to the combination of the information of the preferred coordinated transmitting node with channel quality information of the second link, and sending the channel quality information, which is multiplexed with the bit code information, of the second link to the transmitting end for selection.

11. An apparatus for feeding back information, comprising a processor and a non-transitory processor-readable medium having processor-executable instructions stored thereon, the processor-executable instructions including a plurality of units, the units including:
a measuring unit, configured to measure channel quality information of a first link between each coordinated transmitting node in a coordinated transmitting node set and a terminal;
an obtaining unit, configured to use the channel quality information of the first link and a channel rank indication value corresponding to the first link as parameters of a spectral efficiency calculation function, and obtain a first spectral efficiency value corresponding to the first link;
a selecting unit, configured to use a second spectral efficiency value corresponding to a second link and the first spectral efficiency value corresponding to the first link as parameters of a selection criterion function, and when a value of the selection criterion function is less than or equal to a preconfigured comparison threshold value, select the coordinated transmitting node as a preferred coordinated transmitting node; and
a sending unit, configured to send information of the preferred coordinated transmitting node selected by the selecting unit to a transmitting end for selection.

12. The apparatus according to claim 11, wherein the apparatus further comprises:
a receiving unit, configured to receive measurement configuration information sent by the transmitting end, wherein the measurement configuration information comprises at least the preconfigured comparison threshold value and a transmission mode of the first link.

13. The apparatus according to claim 12, wherein the transmission mode of the first link is consistent with a transmission mode of the second link.

14. The apparatus according to claim 12, wherein the measurement configuration information further comprises a quantity of sub-bands of each coordinated transmitting node, and a report mode and a report resource of information of each preferred coordinated transmitting node.

15. The apparatus according to claim 12, wherein:
the obtaining unit is further configured to use channel quality information $d_{SINR}$ and a channel rank indication value $RI^S$ that are corresponding to the first link as parameters of a spectral efficiency calculation function $F(\bullet)$, and obtain a spectral efficiency value $d_{SE}^S = F(d_{SINR}, RI^S)$ corresponding to the first link;
a precoding matrix indication value required for measuring the channel quality information $d_{SINR}$ of the first link is obtained by the terminal by measuring the first link; and the channel rank indication value corresponding to the first link is a smaller value between a quantity of antenna ports for a channel state information reference signal or a cell specific reference signal of each coordinated transmitting node and a channel rank indication value corresponding to the second link.

16. The apparatus according to claim 12, wherein:
the selecting unit is further configured to use a spectral efficiency value $d_{SE}^P$ corresponding to the second link and a spectral efficiency value $d_{SE}^S$ corresponding to the first link as parameters of a selection criterion function $F(\bullet)$, and when a value of $f(d_{SE}^P, d_{SE}^S)$ is less than or equal to a preconfigured comparison threshold value $d_{Thr}$, select the corresponding coordinated transmitting node as the preferred coordinated transmitting node.

17. The apparatus according to claim 12, wherein:
the sending unit is further configured to use bit information to represent the information of the preferred coordinated transmitting node, and send the bit information to the transmitting end for selection, wherein a bit number in the bit information is used to indicate a number of a coordinated transmitting node, and bit content is used to indicate that the coordinated transmitting node is the preferred coordinated transmitting node.

18. The apparatus according to claim 17, wherein:
the sending unit is further configured to use the bit information to represent the information of the preferred coordinated transmitting node, multiplex the information with channel quality information of the second link, and send the channel quality information, which is multiplexed with the bit information, of the second link to the transmitting end for selection.

19. The apparatus according to claim 12, wherein:
the sending unit is further configured to send bit coding information corresponding to a combination of the information of the preferred coordinated transmitting node to the transmitting end for selection.

20. The apparatus according to claim 19, wherein:
the sending unit is further configured to multiplex the bit coding information corresponding to the combination of the information of the preferred coordinated transmitting node to channel quality information of the second link, and send the channel quality information, which is multiplexed with the bit code information, of the second link to the transmitting end for selection.

* * * * *